United States Patent
Chen (10) Patent No.: US 10,624,190 B1
(45) Date of Patent: Apr. 14, 2020

(54) MICRO LIGHT-EMITTING DIODE DRIVING CIRCUIT AND METHOD FOR DRIVING THE SAME

(71) Applicant: MIKRO MESA TECHNOLOGY CO., LTD., Apia (WS)

(72) Inventor: Li-Yi Chen, Tainan (TW)

(73) Assignee: MIKRO MESA TECHNOLOGY CO., LTD., Apia (WS)

( * ) Notice: Subject to any disclaimer, the term of this patent is extended or adjusted under 35 U.S.C. 154(b) by 0 days.

(21) Appl. No.: 16/253,197

(22) Filed: Jan. 21, 2019

(51) Int. Cl.
G09G 3/32 (2016.01)
H05B 45/44 (2020.01)
H05B 45/10 (2020.01)

(52) U.S. Cl.
CPC .............. *H05B 45/44* (2020.01); *G09G 3/32* (2013.01); *H05B 45/10* (2020.01); *G09G 2310/027* (2013.01); *G09G 2320/0276* (2013.01); *G09G 2330/021* (2013.01)

(58) Field of Classification Search
CPC ...... G09G 3/32; G09G 3/3233; G09G 3/3275; G09G 3/20; G09G 2300/0819; G09G 2300/0842; G09G 2300/0861; G09G 2310/0248; G09G 2310/0262; G09G 2320/0252; G09G 2320/0271; G09G 2320/029; G09G 2320/041; G09G 2320/043; G09G 2320/045; G09G 2330/02; G09G 3/3241; G09G 3/3258; G09G 3/3266; G09G 3/3283; G09G 3/3291; H01L 27/3276
See application file for complete search history.

(56) References Cited

U.S. PATENT DOCUMENTS

| | | | |
|---|---|---|---|
| 2014/0368562 A1* | 12/2014 | Kim | G09G 3/3614 345/694 |
| 2018/0061307 A1* | 3/2018 | Inoue | G09G 3/3275 |
| 2018/0075798 A1* | 3/2018 | Nho | G09G 3/32 |
| 2018/0130392 A1* | 5/2018 | Zhang | G09G 3/20 |
| 2018/0151593 A1* | 5/2018 | Inoue | G09G 3/3233 |
| 2018/0182288 A1* | 6/2018 | Kim | G09G 3/3225 |
| 2018/0182297 A1* | 6/2018 | Lee | G09G 3/2077 |

(Continued)

OTHER PUBLICATIONS

Digital to Analog Converter Design using Single Electron Transistors by Jonathon C Perry, Apr. 29, 2005.*

*Primary Examiner* — Alexander H Taningco
*Assistant Examiner* — Syed M Kaiser
(74) *Attorney, Agent, or Firm* — CKC & Partners Co., LLC (57) ABSTRACT

A micro light-emitting diode driving circuit including a micro light-emitting diode, a driving circuit, and a digital-to-analog converter is provided. The driving circuit includes a driving transistor electrically coupled to the micro light-emitting diode in series. The digital-to-analog converter is electrically coupled to a gate terminal of the driving transistor and is configured to provide grayscale voltage levels of the micro light-emitting diode to the driving circuit and the micro light-emitting diode. The grayscale voltage levels are determined by a gamma curve. A driving voltage is applied to the driving transistor and the micro light-emitting diode, such that at least one-sixteenth of the whole grayscale voltage levels of the micro light-emitting diode is within a linear region of at least one of current-voltage curves of the driving transistor. An accessible working range of the micro light-emitting diode is about 2 volts.

6 Claims, 7 Drawing Sheets

(56) References Cited

U.S. PATENT DOCUMENTS

| | | | |
|---|---|---|---|
| 2018/0233089 A1* | 8/2018 | Okamoto | G09G 3/2003 |
| 2018/0240404 A1* | 8/2018 | Furihata | G09G 3/3258 |
| 2018/0336816 A1* | 11/2018 | Shin | G09G 3/32 |
| 2019/0087620 A1* | 3/2019 | Kim | G06K 9/0002 |
| 2019/0378459 A1* | 12/2019 | Kim | G09G 3/3258 |
| 2020/0013344 A1* | 1/2020 | Jeon | G09G 3/2074 |

* cited by examiner

MICRO LIGHT-EMITTING DIODE DRIVING CIRCUIT AND METHOD FOR DRIVING THE SAME

BACKGROUND

Field of Invention

The present disclosure relates to a micro light-emitting diode driving circuit and method for driving a micro light-emitting diode which enables low power consumption.

Description of Related Art

The statements in this section merely provide background information related to the present disclosure and do not necessarily constitute prior art.

In recent years, micro devices have become popular in various applications. One of the promising subfields is micro light-emitting diode devices, displays, or driving circuits. One of the important issues of said subfield is minimizing the power consumption of such circuits or displays.

SUMMARY

According to some embodiments of the present disclosure, a micro light-emitting diode driving circuit including a micro light-emitting diode, a driving circuit, and a digital-to-analog converter is provided. The driving circuit includes a driving transistor electrically coupled to the micro light-emitting diode in series. The digital-to-analog converter is electrically coupled to a gate terminal of the driving transistor and is configured to provide grayscale voltage levels of the micro light-emitting diode to the driving circuit and the micro light-emitting diode. The grayscale voltage levels are determined by a gamma curve. A driving voltage is applied to the driving transistor and the micro light-emitting diode, such that at least one-sixteenth of the whole grayscale voltage levels of the micro light-emitting diode is within a linear region of at least one of current-voltage curves of the driving transistor. Said at least one-sixteenth of the whole grayscale voltage levels is counted from a maximum brightness of the micro light-emitting diode within the grayscale voltage levels. An accessible working range of the micro light-emitting diode is about 2 volts.

According to some embodiments of the present disclosure, a driving method for a micro light-emitting diode driving circuit is provided. The driving method includes: determining grayscale voltage levels of a micro light-emitting diode through a gamma curve, wherein the grayscale voltage levels are discrete, and an accessible working range of the micro light-emitting diode is about 2 volts; choosing a portion of the grayscale voltage levels, wherein said portion of the grayscale voltage levels is at least one-sixteenth of the whole grayscale voltage levels counted from a maximum brightness of the micro light-emitting diode within the grayscale voltage levels; determining a gate voltage of a driving transistor by a value of current corresponding to a minimal boundary of said portion of the grayscale voltage levels, so that said value of current corresponds to a pinch-off point of one of the current-voltage curves of the driving transistor, wherein the driving transistor and the micro light-emitting diode are electrically coupled to one another in series; and determining a driving voltage applied to the driving transistor and the micro light-emitting diode, such that a voltage difference between a gate-to-source voltage and a threshold voltage of the driving transistor is equal to a voltage difference between the driving voltage and a voltage across the micro light-emitting diode.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the present disclosure. In other instances, well-known semiconductor processes and manufacturing techniques have not been described in particular detail in order to not unnecessarily obscure the present disclosure. Reference throughout this specification to "one embodiment," "an embodiment", "some embodiments" or the like means that a particular feature, structure, configuration, or characteristic described in connection with the embodiment is included in at least one embodiment of the disclosure. Thus, the appearances of the phrase "in one embodiment," "in an embodiment", "in some embodiments" or the like in various places throughout this specification are not necessarily referring to the same embodiment of the disclosure. Furthermore, the particular features, structures, configurations, or characteristics may be combined in any suitable manner in one or more embodiments.

Although most of terms described in the following disclosure use singular nouns, said terms may also be plural in accordance with figures or practical applications.

Figure 1:
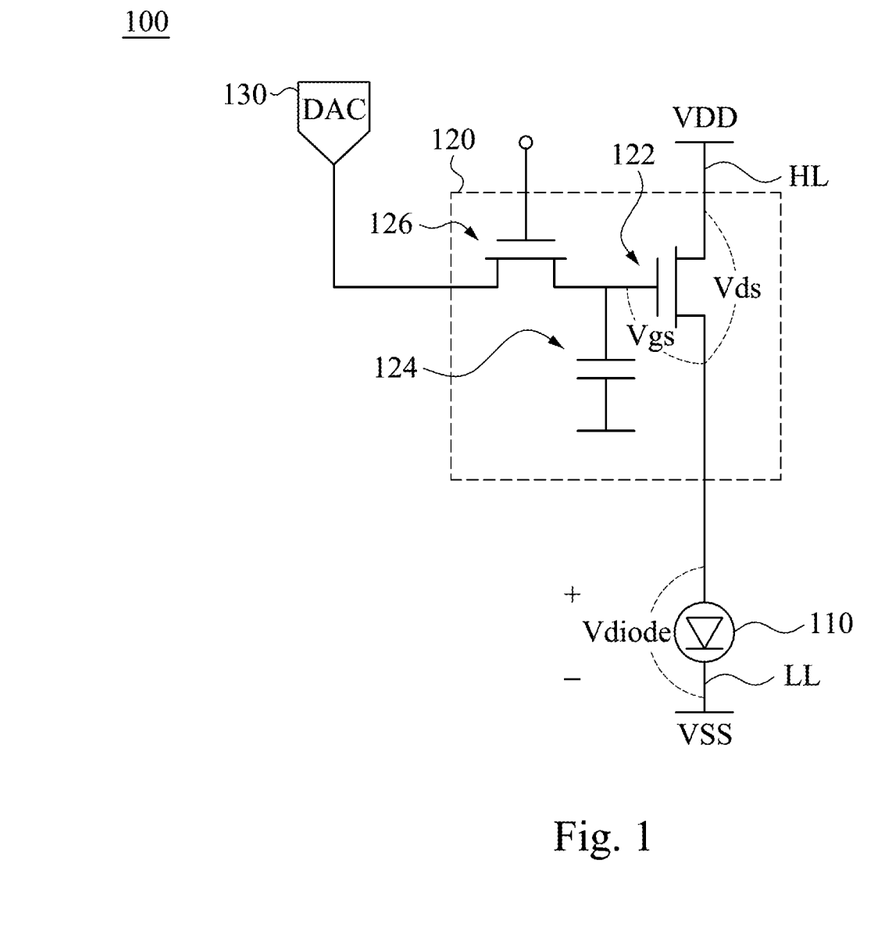
FIG. 1 is a schematic diagram of a micro light-emitting diode driving circuit according to some embodiments of the present disclosure.

Reference is made to FIG. 1. FIG. 1 is a schematic diagram of a micro light-emitting diode driving circuit 100 according to some embodiments of the present disclosure. In some embodiments, the micro light-emitting diode driving circuit 100 includes a micro light-emitting diode 110, a driving circuit 120, and a digital-to-analog converter 130. The driving circuit 120 includes a driving transistor 122 electrically coupled to the micro light-emitting diode 110 in series with respect to a high-level voltage line HL and a low-level voltage line LL. The high-level voltage line HL is configured to directly receive a driving voltage VDD. The low-level voltage line LL is connected to a low-voltage source VSS. The low-voltage source VSS may have a voltage level which is grounded, but should not be limited thereto. The digital-to-analog converter 130 is electrically coupled to a gate terminal of the driving transistor 122 and is configured to provide grayscale voltage levels VL of the micro light-emitting diode 110 to the driving circuit 120 and the micro light-emitting diode 110. The grayscale voltage levels VL are determined by a gamma curve. The gamma curve is often used to optimize the usage of bits when encoding an image by a nonlinear manner which suits for the way that humans perceive light. It can avoid that too many bits are allocated to voltages that correspond to light intensities that humans cannot differentiate.

Figure 2:
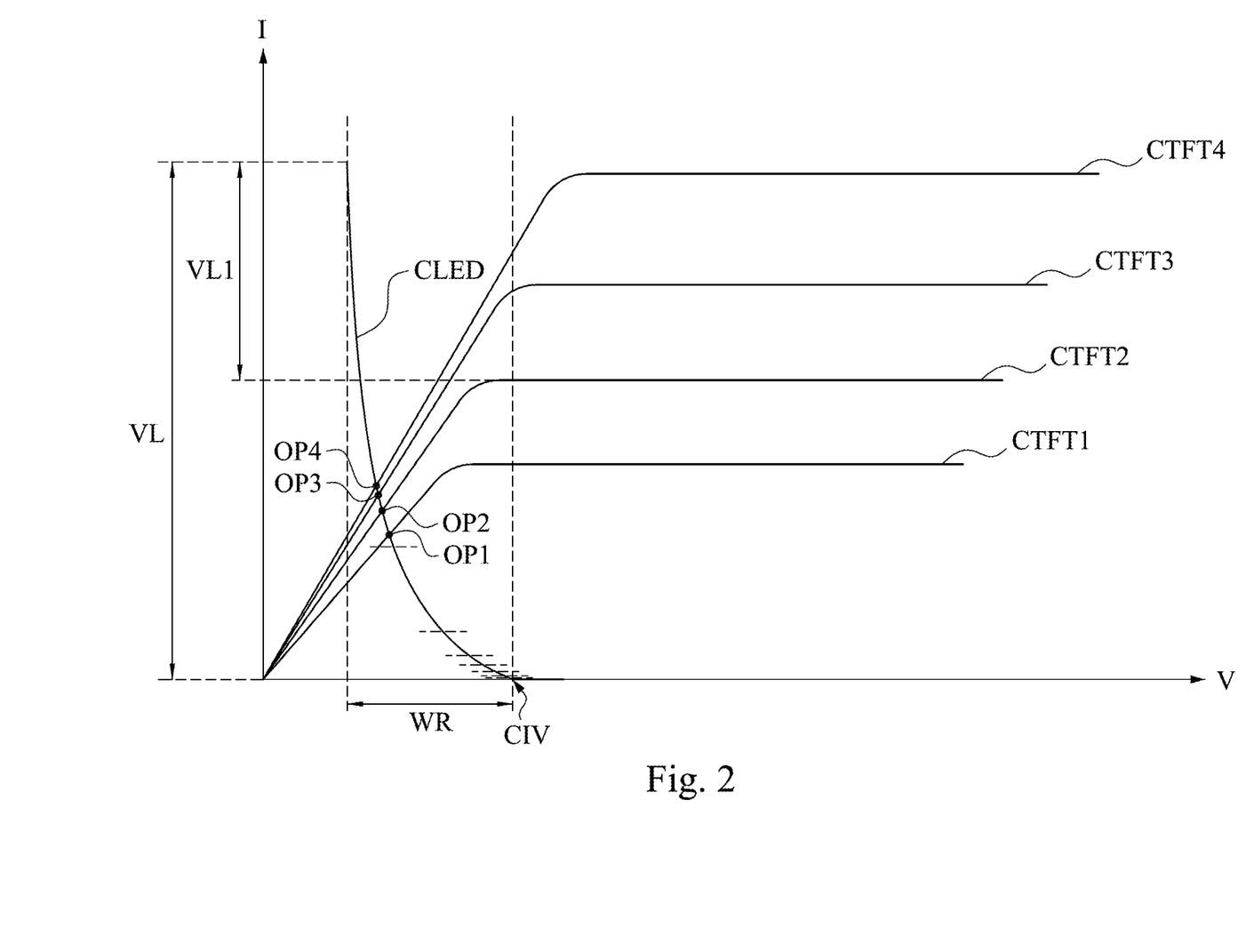
FIG. 2 is a schematic diagram of a current versus voltage curve of the driving transistor and the light-emitting diode according to some embodiments of the present disclosure.

Reference is made to FIGS. 1 and 2. FIG. 2 is a schematic diagram of a current (I) versus voltage (V) curve of the driving transistor 122 and the light-emitting diode 110 according to some embodiments of the present disclosure. Current-voltage curves CTFT1, CTFT2, CTFT3, and CTFT4 correspond to different gate voltages applied to the driving transistor 122 respectively, with the current-voltage curve CTFT1 corresponding to the lowest gate voltage and the current-voltage curve CTFT4 corresponding to the highest gate voltage among the current-voltage curves CTFT1, CTFT2, CTFT3, and CTFT4 as shown in FIG. 2. A current-voltage curve CLED for the micro light-emitting diode 110 is present in the same curve graph as that for the driving transistor 122, so as to reveal operation points OP1, OP2, OP3, and OP4 by an intersectional point between the current-voltage curve CLED for the micro light-emitting diode 110 and one of the current-voltage curves CTFT1, CTFT2, CTFT3, and CTFT4 of the driving transistor 122. In these embodiments, a driving voltage VDD is applied to the driving transistor 122 and the micro light-emitting diode 110, such that at least one-sixteenth VL1 of the whole grayscale voltage levels VL of the micro light-emitting diode 110 is within a linear region of at least one of current-voltage curves (e.g., current-voltage curves CTFT1, CTFT2, CTFT3, and CTFT4, as shown in FIG. 2) of the driving transistor 122. The one-sixteenth VL1 of the whole grayscale voltage levels VL is counted from a maximum brightness of the micro light-emitting diode 110 within the grayscale voltage levels VL. An accessible working range WR of the micro light-emitting diode 110 is about 2 volts (e.g., from about 2.5V to about 4V), which is much narrower than a working range (e.g., 5 volts) of a conventional organic light-emitting diode (OLED). Said "accessible working range" means that voltages from a cut in voltage CIV of the micro light-emitting diode 110 to a voltage corresponding to an infinite current in ideal flowing through the micro light-emitting diode 110. Below the cut in voltage the current flowing through the micro light-emitting diode 110 is substantially zero. Under the above conditions, the operation points OP1, OP2, OP3, and OP4 of the current-voltage curve CLED for the micro light-emitting diode 110 can correspond to lower drain-to-source voltage Vds of the driving transistor 122, such that the micro light-emitting diode driving circuit 100 can achieve low power consumption due to lower accessible working range WR of the micro light-emitting diode 110 compared to the OLED and lower drain-to-source voltage Vds (i.e., the micro light-emitting diode 110 can be driven and worked with a lower driving voltage VDD, such as lower than 8 volts). Noted that in the above embodiments, a voltage relation: VDD=Vds+Vdiode is satisfied. Vdiode is a voltage across the micro light-emitting diode 110. Specifically, the drain-to-source voltage Vds is within the linear region of the driving transistor 122. It is found in the embodiments of the present disclosure that the above benefit of the low power consumption micro light-emitting driving circuit 100 can be practically implemented when the accessible working range WR of the light-emitting diode 110 is narrow enough (e.g., about 2 volts as demonstrated in the embodiments of the present disclosure) to be tuned and shifted to the linear region of the driving transistor 122 by the driving voltage VDD. Said working range WR can be realized by a light-emitting diode 110 with a lateral length less than or equal to 50 μm. To be clearer, the lateral length is a length of the light-emitting diode 110 in a direction perpendicular to a stacking direction of semiconductor layers of the light-emitting diode 110. Said direction of the lateral length is usually parallel to a surface of a substrate where the light-emitting diode 110 is present on. It should be noted that, conventional light-emitting devices such as organic light-emitting diodes (OLED) cannot achieve low power consumption since a working range of OLEDs is about 5 volts to about 10 volts, which is too broad to be tuned and shifted to the above conditions by the driving voltage VDD mentioned in the above embodiments.

In general, the grayscale voltage levels VL have $2^N$ levels. N is a provided bit number. For instance, when there are 8 bits provided to the digital-to-analog converter 130, the grayscale voltage levels VL have 256 levels. The one-sixteenth VL1 of the whole grayscale voltage levels VL is counted from a voltage level which corresponds to the maximum brightness of the micro light-emitting diode 110 within the grayscale voltage levels VL, and also to the following other 15 levels (i.e., totally 16 levels) which correspond to gradually darker brightness of the micro light-emitting diode 110. When there are 10 bits provided, the grayscale voltage levels VL have 1024 levels. The one-sixteenth VL1 of the whole grayscale voltage levels VL is counted from the voltage level which corresponds to the maximum brightness of the micro light-emitting diode 110 within the grayscale voltage levels VL, and to the following other 63 levels (i.e., totally 64 levels) which correspond to gradually darker brightness of the micro light-emitting diode 110.

As shown in FIG. 1, in some embodiments, the micro light-emitting diode driving circuit 100 includes a storage capacitor 124 which is electrically coupled to the driving transistor 122 and is configured to stabilize the gate voltage of the driving transistor 122. Specifically, the storage capacitor 124 is used to store voltages applied by the digital-to-analog converter 130 and then serve as sources to provide gate voltages to the driving transistor 122. In some embodiments, the light-emitting diode driving circuit 100 includes a switching transistor 126 which is electrically coupled to the driving transistor 122 and the storage capacitor 124 and is configured to turn on and off the driving transistor 122. Specifically, the switching transistor 126 is used to determine if voltages from the digital-to-analog converter 130 can be applied to the gate terminal of the driving transistor 122, so as to determine an amount of current flowing through the driving transistor 122 from a drain terminal to a source terminal of the driving transistor 122.

Figure 3:
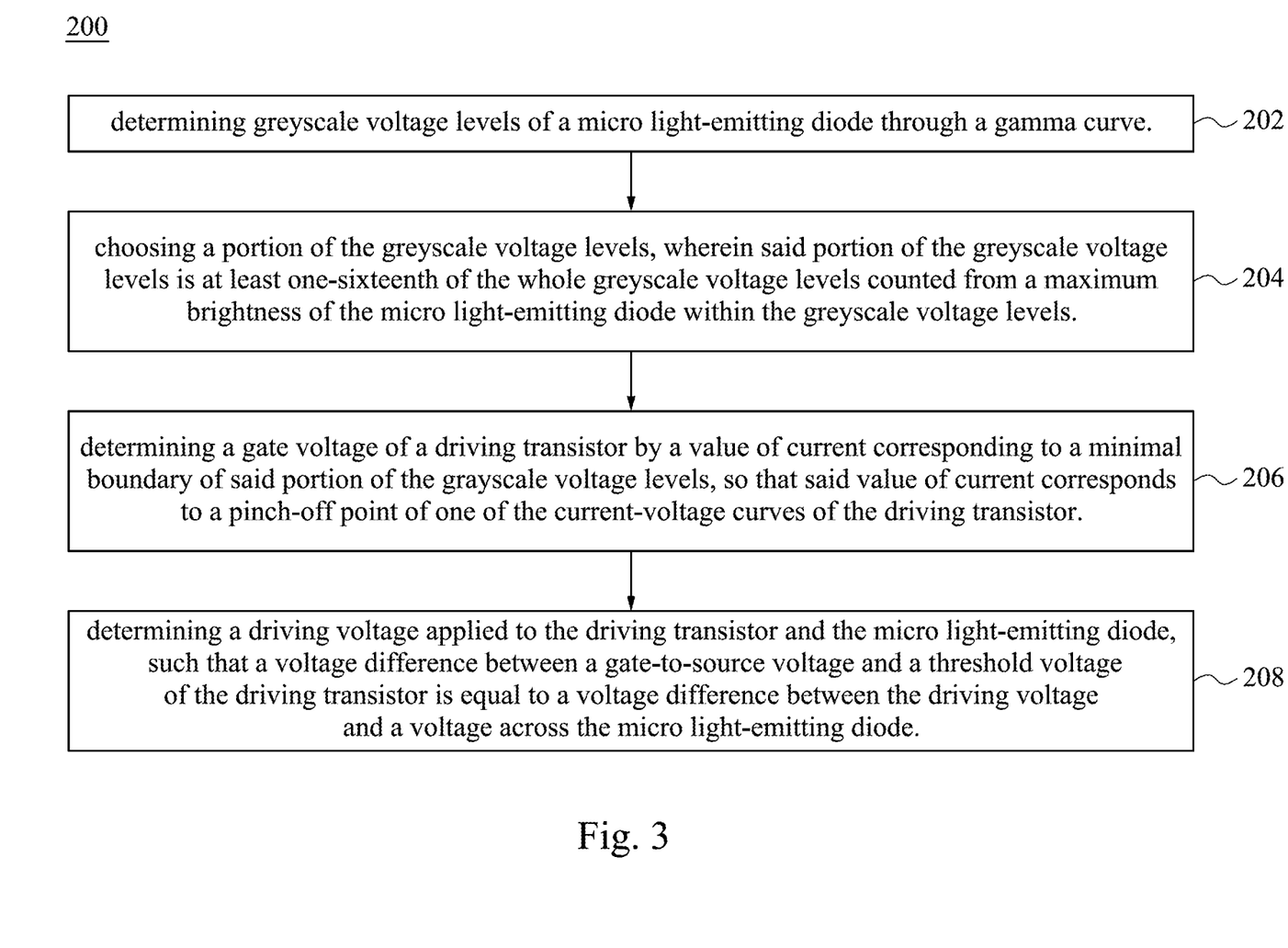
FIG. 3 is a flowchart of a driving method according to some embodiments of the present disclosure.

Reference is made to FIG. 3 and FIGS. 4A to 4D. FIG. 3 is a flowchart of a driving method 200 according to some embodiments of the present disclosure. FIGS. 4A to 4D are schematic current-to-voltage curves for intermediate operations of the driving method 200 according to some embodiments of the present disclosure. In some embodiments, the driving method 200 for the micro light-emitting diode driving circuit 100 is provided. The driving method 200 begins with operation 202 in which grayscale voltage levels of a micro light-emitting diode 110 is determined through a gamma curve (referred to FIG. 4A). It should be noted that, the grayscale voltage levels are discrete. Also, an accessible working range WR of the micro light-emitting diode 110 is about 2 volts.

Figure 4A:
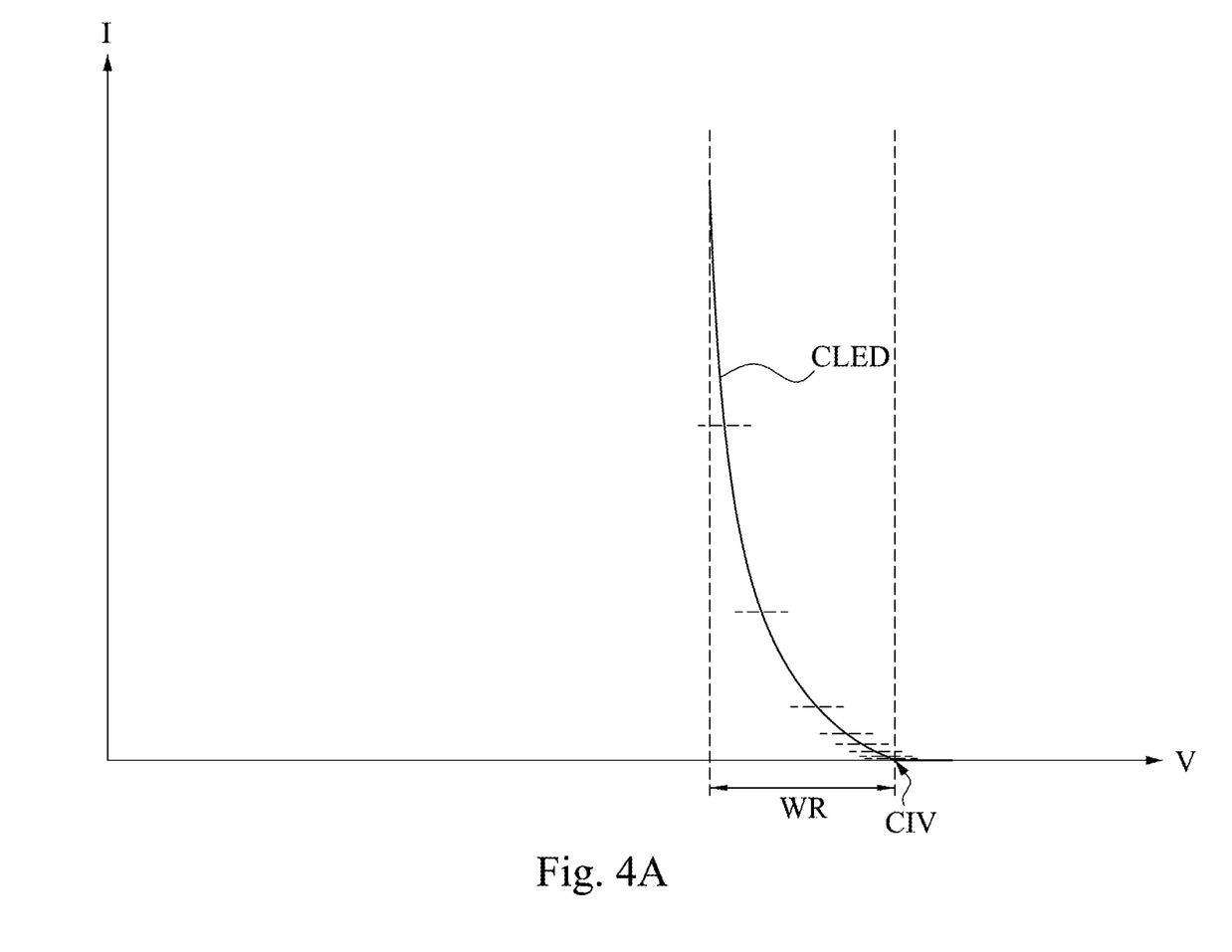
FIG. 4A is a schematic current-to-voltage curves for an intermediate operation of the driving method according to some embodiments of the present disclosure.
Figure 4B:
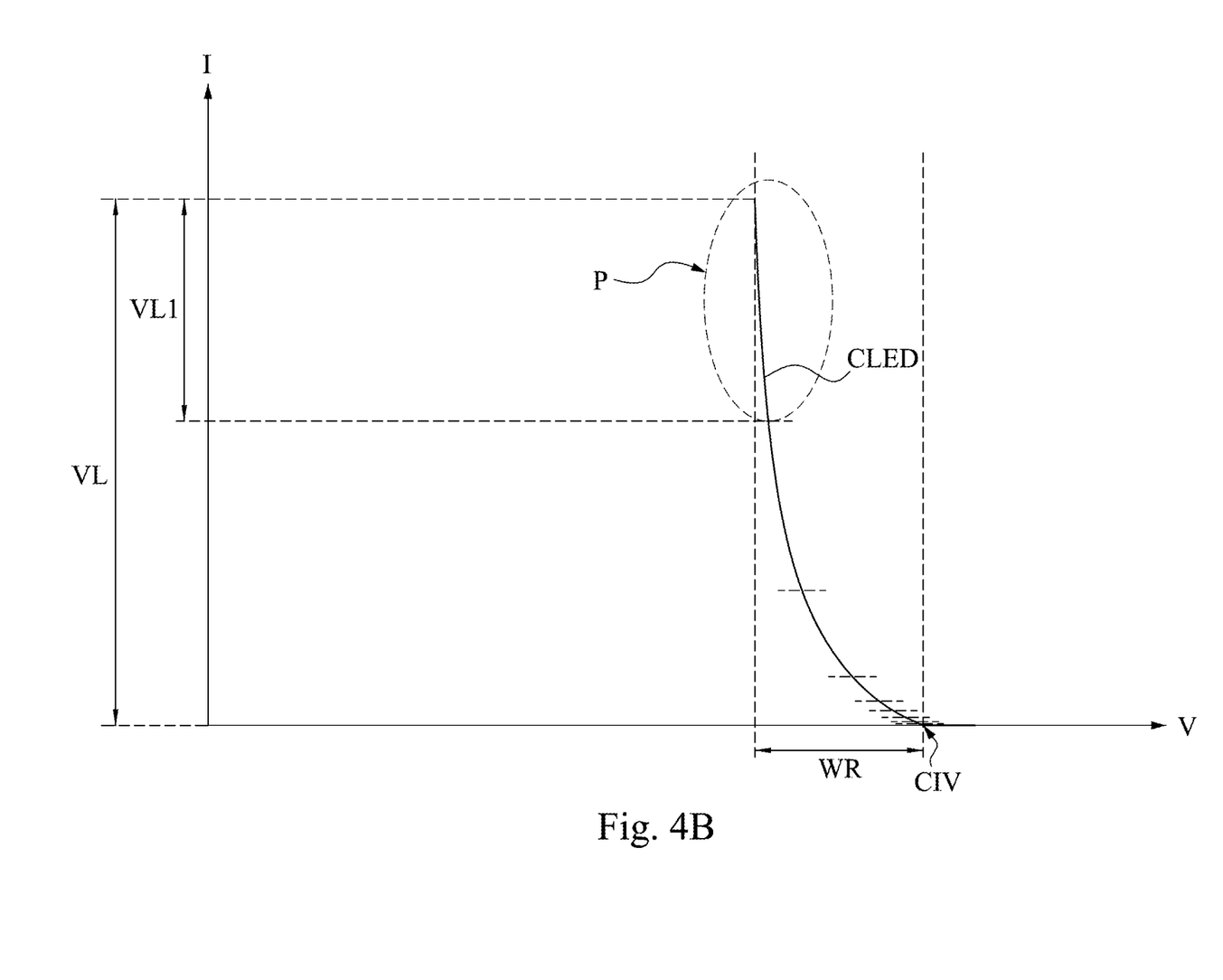
FIG. 4B is a schematic current-to-voltage curves for an intermediate operation of the driving method according to some embodiments of the present disclosure.

The driving method 200 continues with operation 204 in which a portion P of the grayscale voltage levels VL is chosen (referred to FIG. 4B). The portion P is chosen to be operated within a linear region of at least one of current-voltage curves (e.g., the current-voltage curves CTFT1, CTFT2, CTFT3, and CTFT4 shown in FIG. 2) of the driving transistor 122. Said portion P of the grayscale voltage levels VL is at least one-sixteenth VL1 of the whole grayscale voltage levels VL counted from the voltage level which corresponds to a range of intensity including a maximum brightness of the micro light-emitting diode 110 within the grayscale voltage levels VL.

Figure 4C:
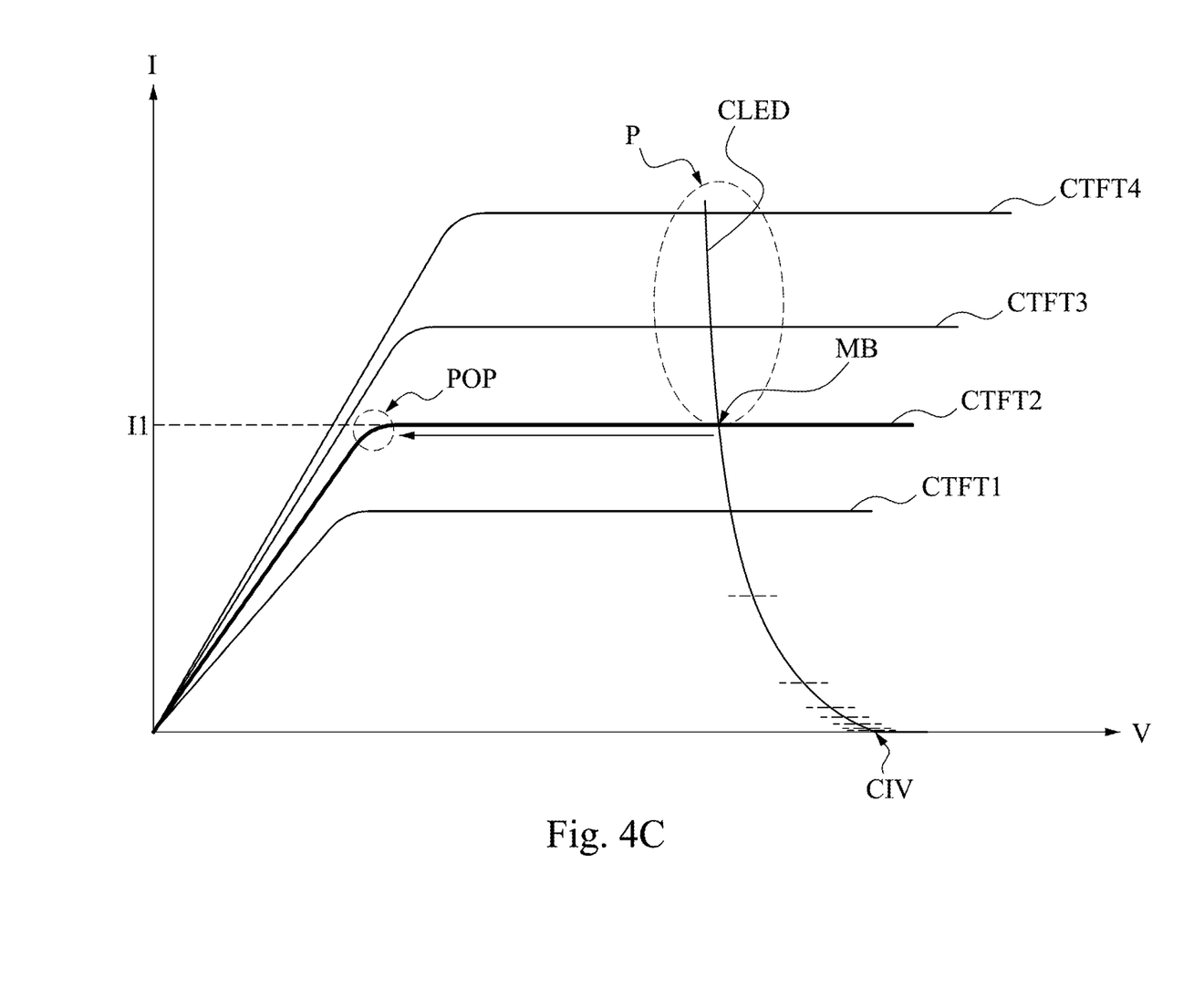
FIG. 4C is a schematic current-to-voltage curves for an intermediate operation of the driving method according to some embodiments of the present disclosure.

The driving method 200 continues with operation 206 in which a gate voltage of a driving transistor 122 is determined by a value of current 11 corresponding to a minimal boundary MB of said portion P of the grayscale voltage levels VL (refereed to FIG. 4C), so that said value of current 11 corresponds to a pinch-off point POP of one of the current-voltage curves (e.g., the current-voltage curve CTFT2 as shown in FIG. 4C) of the driving transistor 122. The driving transistor 122 and the micro light-emitting diode 110 are electrically coupled to one another in series with respect to the high-level voltage line HL and the low-level voltage line LL.

Figure 4D:
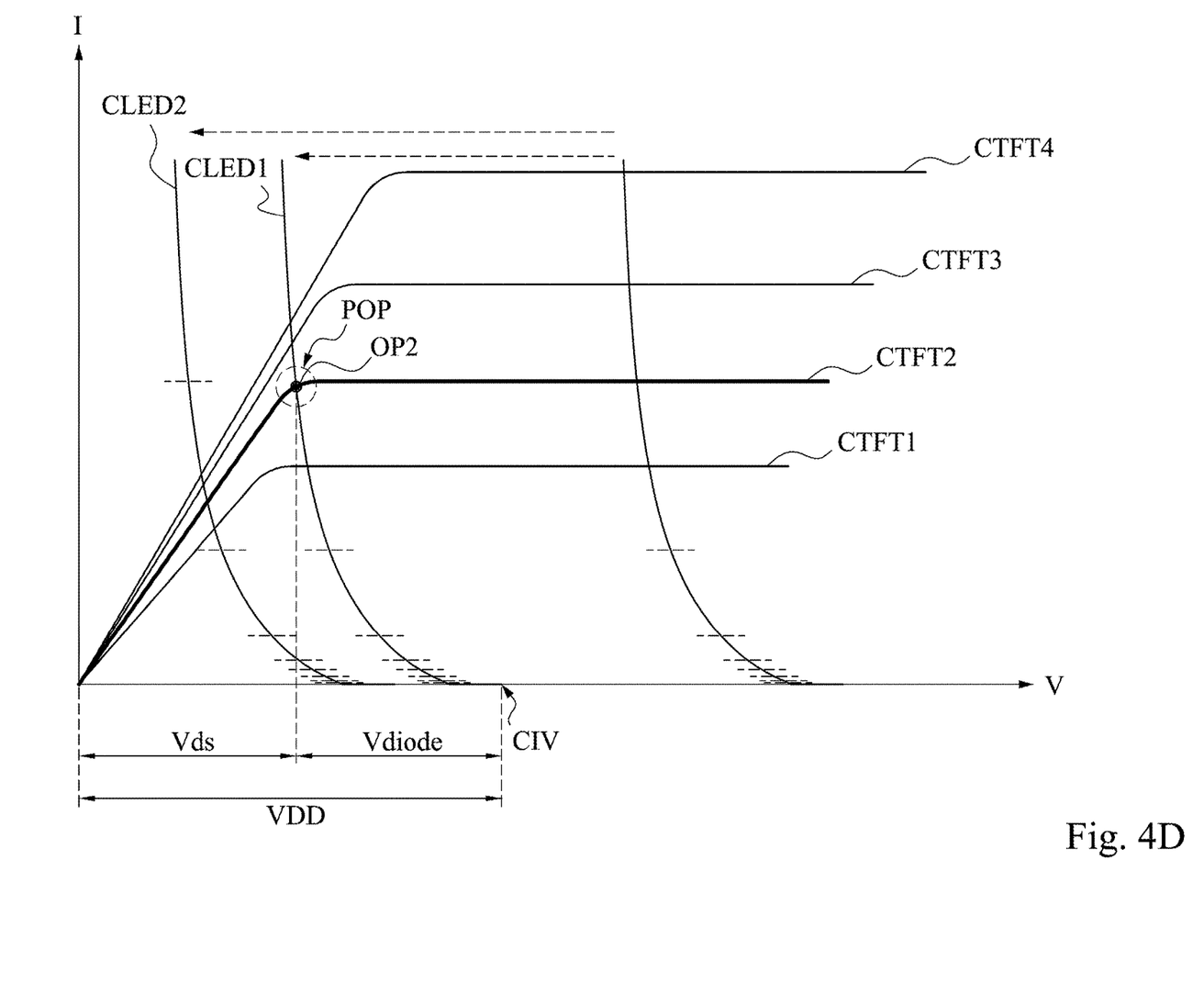
FIG. 4D is a schematic current-to-voltage curves for an intermediate operation of the driving method according to some embodiments of the present disclosure.

The driving method 200 continues with operation 208 in which the driving voltage VDD applied to the driving transistor 122 and the micro light-emitting diode 110 is determined, such that a voltage difference between a gate-to-source voltage Vgs and a threshold voltage of the driving transistor 122 is equal to a voltage difference between the driving voltage VDD and the voltage Vdiode across the micro light-emitting diode 110 (referred to FIG. 4D). This condition makes said driving voltage VDD become a critical voltage so that the minimal boundary MB of said portion P of the grayscale voltage levels VL coincides the operation point OP2 of the light-emitting diode 110 (the current-voltage curve CLED1 as shown in FIG. 4D), and said operation point OP2 overlaps with the pinch-off point POP of the current-voltage curves CTFT2 of the driving transistor 122. Beyond this critical voltage, the driving voltage VDD is allowed to be further tuned to make more than one-sixteenth VL1 of the whole grayscale voltage levels VL be within linear regions of current-voltage curves (e.g., the current-voltage curves CTFT1, CTFT2, CTFT3, and CTFT4, as shown in FIG. 2) of the driving transistor 122, such as a current-voltage curve CLED2 for the micro light-emitting diode 110 as shown in FIG. 4D. It should be noted that, the grayscale voltage levels are implemented and generated by the digital-to-analog converter 130, and a sequence of operations 202, 204, 206, and 208 in the method 200 is not restricted to the disclosed sequence. Under the above conditions and operations, the micro light-emitting diode driving circuit 100 can achieve low power consumption. The reason has been described before and will not be repeated herein.

In summary, a micro light-emitting diode driving circuit and a driving method for the micro light-emitting diode driving circuit are provided in the embodiments of the present disclosure to realize a low power consumption driven circuit or display for micro light-emitting diodes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A micro light-emitting diode driving circuit, comprising:
    a micro light-emitting diode;
    a driving circuit comprising a driving transistor electrically coupled to the micro light-emitting diode in series; and
    a digital-to-analog converter electrically coupled to a gate terminal of the driving transistor and configured to provide grayscale voltage levels of the micro light-emitting diode to the driving circuit and the micro light-emitting diode, the grayscale voltage levels being determined by a gamma curve,
    wherein a driving voltage is applied to the driving transistor and the micro light-emitting diode, such that at least one-sixteenth of the whole grayscale voltage levels of the micro light-emitting diode is within a linear region of at least one of current-voltage curves of the driving transistor, said at least one-sixteenth of the whole grayscale voltage levels is counted from a maximum brightness of the micro light-emitting diode within the grayscale voltage levels, and an accessible working range of the micro light-emitting diode is about 2 volts.

2. The micro light-emitting diode driving circuit of claim 1, further comprising a storage capacitor electrically coupled to the driving transistor and configured to stabilize a gate voltage of the driving transistor.

3. The micro light-emitting diode driving circuit of claim 2, further comprising a switching transistor electrically coupled to the driving transistor and the storage capacitor and configured to turn on and off the driving transistor.

4. The micro light-emitting diode driving circuit of claim 1, wherein the grayscale voltage levels have 2N levels, and N is a provided bit number.

5. A driving method for a micro light-emitting diode driving circuit, comprising:
    determining grayscale voltage levels of a micro light-emitting diode through a gamma curve, wherein the grayscale voltage levels are discrete, and an accessible working range of the micro light-emitting diode is about 2 volts;
    choosing a portion of the grayscale voltage levels, wherein said portion of the grayscale voltage levels is at least one-sixteenth of the whole grayscale voltage levels counted from a maximum brightness of the micro light-emitting diode within the grayscale voltage levels;

determining a gate voltage of a driving transistor by a value of current corresponding to a minimal boundary of said portion of the grayscale voltage levels, so that said value of current corresponds to a pinch-off point of one of the current-voltage curves of the driving transistor, wherein the driving transistor and the micro light-emitting diode are electrically coupled to one another in series;

determining a driving voltage applied to the driving transistor and the micro light-emitting diode, such that a voltage difference between a gate-to-source voltage and a threshold voltage of the driving transistor is equal to a voltage difference between the driving voltage and a voltage across the micro light-emitting diode; and driving the micro light-emitting diode using said gate voltage and said driving voltage.

6. The driving method of claim 5, wherein the grayscale voltage levels have 2N levels, and N is a natural number.

* * * * *